United States Patent
Georgis et al.

(10) Patent No.: US 8,458,747 B2
(45) Date of Patent: *Jun. 4, 2013

(54) SYSTEM AND METHOD FOR NEIGHBORHOOD OPTIMIZATION FOR CONTENT RECOMMENDATION

(75) Inventors: Nikolaos Georgis, San Diego, CA (US); Paul Jin Hwang, Burbank, CA (US); Frank Li-De Lin, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 273 days.

This patent is subject to a terminal disclaimer.

(21) Appl. No.: 12/947,135

(22) Filed: Nov. 16, 2010

(65) Prior Publication Data

US 2011/0061077 A1    Mar. 10, 2011

Related U.S. Application Data

(63) Continuation of application No. 12/356,659, filed on Jan. 21, 2009, now Pat. No. 7,895,626, which is a continuation of application No. 11/602,566, filed on Nov. 21, 2006, now Pat. No. 7,559,072.

(60) Provisional application No. 60/835,020, filed on Aug. 1, 2006.

(51) Int. Cl.
    *H04N 5/445*    (2011.01)

(52) U.S. Cl.
    USPC .......................................................... 725/46

(58) Field of Classification Search
    None
    See application file for complete search history.

(56) References Cited

U.S. PATENT DOCUMENTS

| | | | |
|---|---|---|---|
| 5,745,735 A * | 4/1998 | Cohn et al. ................. 703/6 |
| 7,072,846 B1 * | 7/2006 | Robinson ................. 705/7.32 |
| 7,559,072 B2 * | 7/2009 | Georgis et al. ................. 725/46 |
| 7,895,626 B2 * | 2/2011 | Georgis et al. ................. 725/46 |
| 2004/0088730 A1 * | 5/2004 | Gopalan et al. ................. 725/93 |
| 2006/0020662 A1 * | 1/2006 | Robinson ................. 709/203 |
| 2006/0150216 A1 * | 7/2006 | Herz et al. ................. 725/50 |

OTHER PUBLICATIONS

S. Kirkpartrick, Optimization by Simulated Annealing, May 13, 1983, vol. 220 No. 4598.*

* cited by examiner

*Primary Examiner* — Cai Chen
(74) *Attorney, Agent, or Firm* — Sony Corporation

(57) ABSTRACT

A cost function is stochastically optimized using, e.g., simulated annealing to render a neighborhood of entities based on which content recommendations can be provided to a user of a home entertainment system. The cost function represents a normalized sum of rating similarity scores from entities of the neighborhood that are related to content items viewed by the user.

11 Claims, 1 Drawing Sheet

SYSTEM AND METHOD FOR NEIGHBORHOOD OPTIMIZATION FOR CONTENT RECOMMENDATION

RELATED APPLICATIONS

This application is a continuation of U.S. patent application Ser. No. 12/356,659, filed Jan. 21, 2009, now U.S. Pat. No. 7,895,626 which is a continuation of and claims priority to U.S. patent application Ser. No. 11/602,566, filed Nov. 21, 2006, now U.S. Pat. No. 7,559,072, which claims priority from U.S. provisional patent application Ser. No. 60/835,020, filed Aug. 1, 2006, incorporated herein by reference. Priority to all of the above applications is claimed.

FIELD OF THE INVENTION

The present invention relates generally to systems and methods for content recommendation.

BACKGROUND OF THE INVENTION

Systems and methods have been developed to recommend content to users of home entertainment systems based on ratings of the content from neighbors (e.g., other home systems in a cable TV system or other entertainment network). It will readily be appreciated that to recommend content to a particular user, selecting the neighborhood members is important, because if the wrong neighborhood is used, the recommendations may not be very useful to the particular person to whom they are made.

As understood herein, current methods of neighborhood selection are not as optimum as they might be. For example, in collaborative filtering (CF), opinions from users in the form of ratings of items are collected, and when the system is asked for a recommendation, the system identifies similar users based on, e.g., similarity of demographics to suggest the items these users have liked in the past. This method is based only on the judgments of the user neighborhood.

User similarity can be estimated using cosine-based similarity between two users, but as recognized herein, relying solely on this method, the number of neighbors typically must be defined in advance without any good way to know how many neighbors is optimal. Thus, the number of neighbors typically is fixed in advance without knowledge of the optimum number of neighbors that might benefit an individual user. Complicating the issue is the fact that the total number of ways of forming a reasonably sized neighborhood of one thousand other users is greater than the number of atoms in the known universe, so that, as recognized herein, at best a pseudo-optimal neighborhood feasibly can be defined. It is to this problem that the present invention is directed.

SUMMARY OF THE INVENTION

A method is disclosed for recommending content to a home system for display of the content on a display device of the home system. The method includes defining a neighborhood of other users using a cost function described below, and based on the neighborhood, providing at least one content recommendation to a user of the home system.

In some embodiments one term of the cost function represents a sum of rating similarity scores from entities of the neighborhood and related to content items viewed by the user. The cost function may be normalized. If desired, the rating similarity scores can be cosine-based similarity scores, and the cost function can be optimized using a stochastic method such as simulated annealing. In some embodiments the simulated annealing can be undertaken using operators described below and referred to as "move", "swap", "swap-swap", and "swap-move".

In another aspect, a system receives ratings from entities that collectively comprise potential neighbors of a subject user in a neighborhood. The system returns content recommendations to the subject user based thereon. The system includes at least one server that is programmed to stochastically establish a pseudo-optimum neighborhood based on the ratings, and to return content recommendations based on the neighborhood.

In yet another aspect, a computer iteratively computes a cost function representing a sum of rating similarity scores from entities of a neighborhood of a home entertainment system and related to content items viewed by a user of the home entertainment system. The neighborhood is used to recommend content to the user of the home entertainment system.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
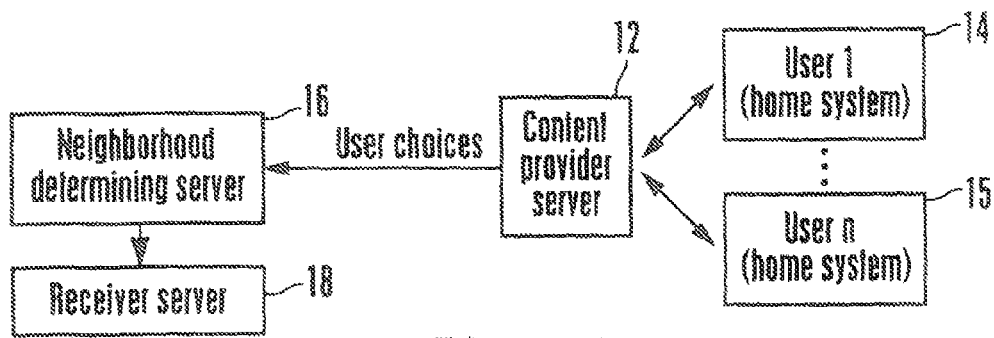
FIG. 1 is a block diagram of a non-limiting system in accordance with the present invention.

Referring initially to FIG. 1, a system is shown, generally designated 10, that includes a content provider server 12 such as but not limited to a cable head end server that can provide content in an intelligent way to a primary user home system 14. The primary home system 14 may include one or more multimedia display devices such as televisions and/or computers and one or more multimedia or content data stores such as DVRs and disk players such as digital video disk (DVD) or Blu-Ray players, etc. that can supply content for display on the display device. Without limitation, the user system interface may be implemented by a set-top box. In lieu of or in addition to a STB, the user system interface may also be implemented by an Internet connection device such as a wired or wireless modem or other type of wide area network connection. Thus, communication between the primary home system 14 and servers described below may be via Internet and/or TV cable and/or broadcast links, both terrestrial and satellite, and can ve two-way, e.g., the primary home system 14 can receive content from the server 12 and communicate back to the server 12 ratings for particular pieces of content.

As shown in FIG. 1, not only the primary home system 14 but neighbor home systems 15 can communicate with the server 12. Like the primary home system 14, the neighbor systems 15 can receive content from the server 12 and communicate back to the server 12 ratings for particular pieces of content. The purpose of this invention to define a near-optimal ("pseudo-optimal") subset of neighbor systems 15 as a "neighborhood" of the primary home system 14, the ratings from which can be used to recommend content to the primary home system 14. It is to be understood that the same process pan be employed for each neighbor system 15, wherein the neighbor system 15 would be the primary home system in the below-described algorithms.

In the non-limiting implementation shown, the content server 12 can communicate with a neighborhood determining server 16 that essentially is a computer which executes the logic below to determine a near-optimal neighborhood. The near-optimal neighborhood can be sent to a recommendation server 18 that can return content recommendations to the primary home system 14 using the neighborhood in accordance with principles known in the art. While three servers 12, 16, 18 are shown, greater or fewer servers can be used.

Figure 2:
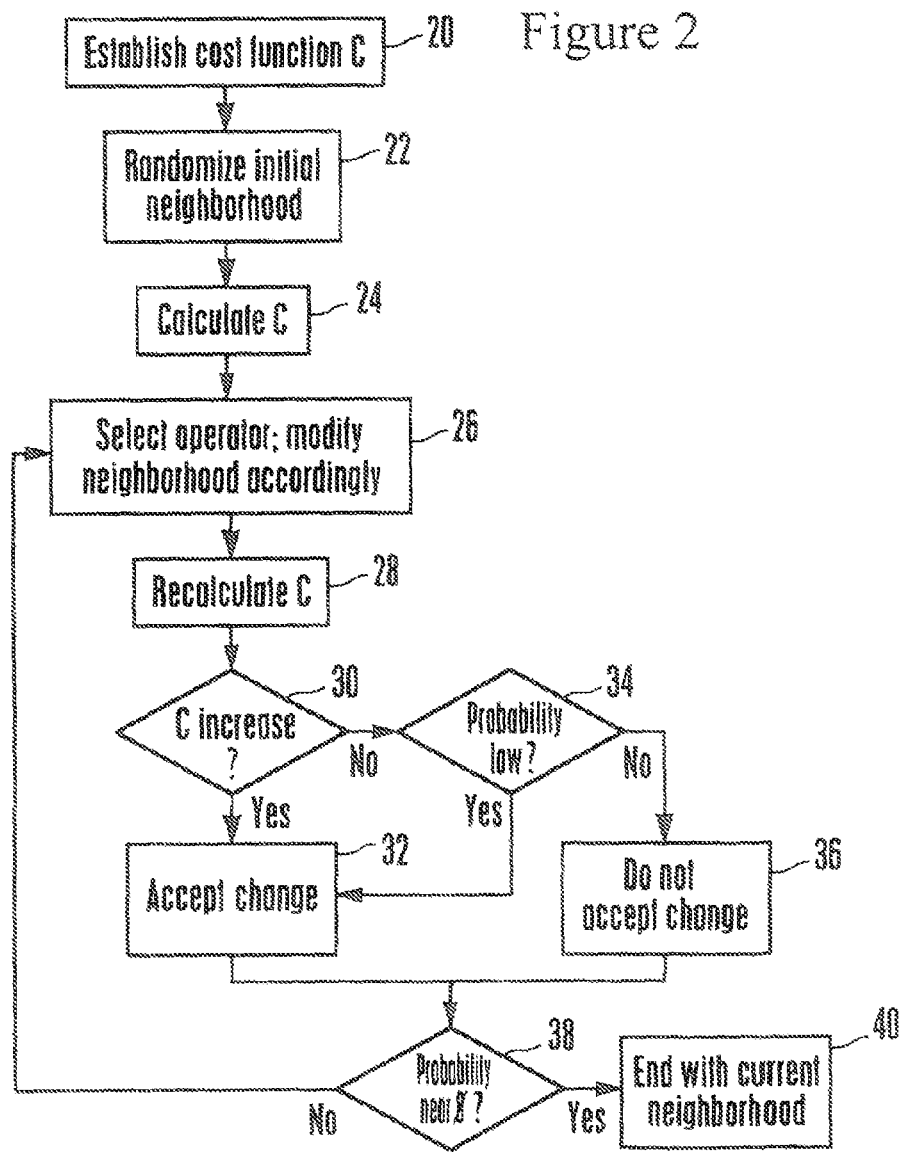
FIG. 2 is a flow chart of the present logic.

Turning now to FIG. 2, at block 20 a cost function C is established. In accordance with present principles, the preferred cost function is given in equation (1). The cost function is used to stochastically establish a pseudo-optimum neighborhood based on ratings from the neighborhood systems 15. The right-most sum in equation (1) represents the sum of rating similarity scores (which can use cosine-based methods or other similarity methods) from the neighborhood systems 15 that are related to content items viewed by a user of the primary home entertainment system 14, and the middle sum essentially is a normalization factor. Stated differently, the cost function C to be optimized is the sum of scores for all content items already in the primary system 14 user's bin for a given neighborhood N, and its range (due to normalization) is from zero to one, with one indicating that an ideally optimal neighborhood has been found.

$$C = f(N) = \frac{1}{|N|} \sum_{s \in \hat{S}} \left( \frac{1}{\sum_{r' \in \hat{C}} |sim(c, c')|} \times \sum_{r' \in \hat{C}} sim(c, c') \times r_{c',s} \right) \quad (1)$$

The above equation in words is C (to be maximized)=1/N times (the sum over all movies s that have been rated) {1/(sum over all candidate neighbors 15 in the current neighborhood of the absolute value of the similarity between the rating from each candidate neighbor 15 and the rating from the primary system 14) times the [(sum over all candidate neighbors 15 in the current neighborhood of the similarity between the rating from each candidate neighbor 15 and the rating from the primary system 14) times the rating from the candidate neighbor for the movie being summed]}.

Once the cost function has been defined, the logic moves to block 22 to define an initial subset of all the neighbor systems 15 as an initial "neighborhood" for the primary system 14. A subset may be selected at random. Proceeding to block 24, the cost function above is calculated a first time.

At block 26, an operator is selected with which the neighborhood is perturbed. In one non-limiting implementation, one of four operators may be selected at block 26. A non-neighborhood one of the systems 15 can be into the neighborhood ("move"), with a "move" also encompassing removing a system 15 from the current neighborhood. The second operator ("swap") involves swapping a system 15 who is not in the current neighborhood with a system 15 who is, while a third operator ("swap-swap") involves swapping a system 15 who is not in the current neighborhood with a system 15 who is in the neighborhood twice in succession. A fourth operator ("swap-move") requires executing a swap then a move in immediate succession.

Proceeding to block 28, after perturbation by an operator at block 26 the cost function is recalculated. Proceeding to decision diamond 30, it is determined whether the value of the cost function increased over the prior value, and if it did the perturbation is accepted at block 32. If however the cost function did not increase at decision diamond 30, the logic moves to decision diamond 34 to accept or not the perturbation with a probability defined by equation (2). Based on the probability and a random draw to compare a number with the probability, the perturbation may be accepted at block 32 or not accepted at block 36 in essence backed out, so that the neighborhood resumes the membership it had prior to perturbing it at block 26.

$$P = e^{-\frac{\Delta C}{T}} \quad (2)$$

$P = e^{-(change\ in\ C)/T}$, where "T" is an empirically determined annealing "temperature."

Decision diamond 38 determines whether the probability is sufficiently low (e.g., below an empirically-determined value) to indicate that a near-optimum neighborhood has been attained. If so, the process ends at state 40 to output the current neighborhood as that on which to base recommendations to the primary system 14. Otherwise, the logic loops back to block 26.

If desired, incremental cost function evaluation can be used, as can lookup tables. Different operators than those set forth herein may also be used, and fast annealing can be used. Moreover, a standard user-based cost function solution can be used to define the initial neighborhood, and other cost functions may be used.

It may now be appreciated that the present invention can be used as an enhancement to current engines, e.g., to current cosine-based similarity engines, without the need for pair-wise comparison for user/item similarity estimations. Near optimal (also referred to herein as "pseudo-optimal") solutions can be obtained using the present stochastic algorithms. Differently sized neighborhoods advantageously can be used for different users to obtain better solutions can be obtained than existing methods.

As an alternative to simulated annealing, genetic algorithms, so-called ant colony optimization, and other methods may be used.

While the particular SYSTEM AND METHOD FOR NEIGHBORHOOD OPTIMIZATION FOR CONTENT RECOMMENDATION is herein shown and described in detail, it is to be understood that the subject matter which is encompassed by the present invention is limited only by the claims.

What is claimed is:

1. A system for content recommendation comprising:
   a server comprising one or more processors operable to:
      receive ratings from entities that collectively comprise neighbors of a home system; and
      transmit content recommendations to the home system at least partially based on a neighborhood, wherein the neighborhood is based at least in part on the received ratings, wherein the neighborhood is defined using a cost function optimized using simulated annealing by the server, wherein the optimization of the cost function is repeated until the cost function reaches a predetermined value, wherein the cost function is determined at least in part by swapping an entity who is not in the neighborhood with an entity who is in the neighborhood twice in succession ("swap-swap").

2. The system of claim 1, wherein the server defines the neighborhood using the cost function, wherein one term of the cost function represents a sum of rating similarity scores from entities of the neighborhood and related to content items viewed by the home system.

3. The system of claim 2, wherein the cost function is normalized.

4. The system of claim 3, wherein the rating similarity scores are cosine-based similarity scores.

5. The system of claim 1, wherein the simulated annealing is undertaken using at least two operators selected from the group consisting of: moving a non-neighborhood entity into the neighborhood ("move"), moving a neighborhood entity out of the neighborhood ("move"), swapping an entity who is not in the neighborhood with an entity who is in the neighborhood ("swap"), swapping an entity who is not in the neighborhood with an entity who is in the neighborhood twice in succession ("swap-swap"), and executing a swap then a move in immediate succession.

6. A computer for content recommendation, wherein the computer is operable to:
compute a cost function using simulated annealing and represent a sum of rating similarity scores from entities of a neighborhood of a user of a system and related to content items viewed by the user of the system, the neighborhood being used to recommend content to the user of the system, wherein the computer defines the neighborhood using the cost function optimized using simulated annealing, wherein the optimization of the cost function is repeated until the cost function reaches a predetermined value, wherein the simulated annealing is undertaken at least in part by swapping an entity who is not in the neighborhood with an entity who is in the neighborhood twice in succession ("swap-swap").

7. The computer of claim 6, wherein the cost function is normalized.

8. The computer of claim 7, wherein the rating similarity scores are cosine-based similarity scores.

9. The computer of claim 6, wherein the cost function is optimized using a stochastic method.

10. A method for content recommendation, the method comprising:
in a server connected to a system and entities of a neighborhood:
iteratively computing a cost function using simulated annealing, wherein the computed cost function represents a sum of rating similarity scores from the entities of the neighborhood of a user of the system and related to content items viewed by the user of the system, the neighborhood being used to recommend content to the user of the system, wherein the server defines the neighborhood using the cost function optimized using simulated annealing, wherein the server iteratively computes the cost function until the cost function reaches a predetermined value, wherein the simulated annealing is undertaken at least in part by swapping an entity who is not in the neighborhood with an entity who is in the neighborhood twice in succession ("swap-swap").

11. The system of claim 1, wherein the simulated annealing is undertaken using at least two operators selected, wherein the two operators selected are from the group consisting of: swapping an entity who is not in the neighborhood with another entity who is in the neighborhood twice in succession ("swap-swap"), and/or executing a swap then a move in immediate succession.

* * * * *